United States Patent [19]

Rohart

[11] Patent Number: 4,751,596
[45] Date of Patent: Jun. 14, 1988

[54] ARRANGEMENT OF MAGNETIC RECORDING AND/OR READOUT HEADS FOR DISC MEMORIES

[75] Inventor: Patrick Rohart, Le Vesinet, France

[73] Assignee: Societe d'Applications Generales d'Electricite et de Mecanique Sagem, Paris, France

[21] Appl. No.: 899,686

[22] Filed: Aug. 25, 1986

[30] Foreign Application Priority Data

Aug. 26, 1985 [FR] France .................... 85 12719

[51] Int. Cl.$^4$ .................................. G11B 21/02
[52] U.S. Cl. .................................. 360/106
[58] Field of Search .......................... 360/106

[56] References Cited

U.S. PATENT DOCUMENTS 3,170,149 2/1965 Koskie ..................... 360/106
4,150,407 4/1979 Dijkstra ................... 360/106
4,631,611 12/1986 Schneider ................. 360/106

Primary Examiner—A. J. Heinz
Attorney, Agent, or Firm—Fleit, Jacobson, Cohn & Price

[57] ABSTRACT

Arrangement of magnetic recording and/or readout heads for disc memories, these discs comprising on their surfaces a certain number of concentric magnetic zones each constituted by a particular number of circular tracks. In one embodiment of the invention, a hybrid arrangement is provided, that is to say with several heads, which are offset radially but each having a limited radial movement corresponding to the width of a single magnetic zone. In another embodiment of the invention, the support of the pads is actuated through an articulated parallelogram system.

8 Claims, 4 Drawing Sheets

ARRANGEMENT OF MAGNETIC RECORDING AND/OR READOUT HEADS FOR DISC MEMORIES

BACKGROUND OF THE INVENTION

The present invention relates to an arrangement of magnetic recording and/or readout heads for disc memories, these discs comprising on their surfaces a certain number of concentric magnetic areas each constituted by a particular number of circular tracks, the heads being for their part mounted on pads borne by supports so as to be able to move radially with respect to the discs, at a very short distance from the face concerned of the latter.

At present, two different types or arrangement of magnetic heads with respect to a group of magnetic discs are essentially known: those with fixed multiple heads, one head then being provided for each track and on each surface of the disc, which reduces to the maximum the access time to the data on the track concerned, but multiplies very considerably the number of heads of the arrangement; and those with a single but movable head.

The latter type of arrangement is more economical in heads, since one head per surface suffices, but each magnetic head must then be movable radially over the whole extent of the radius of the discs, which, in the majority of cases (head initially distant from the track concerned), increases considerably the access time to the data on the track, this access time t comprising the access time $t_1$ to the track concerned, plus the access time $t_2$ to the data sought in this track.

For a given rotary speed of the discs, the element $t_2$ of this sum cannot be reduced, but it is possible to seek to reduce the time $t_1$ of access to the tracks.

GENERAL DESCRIPTION OF THE INVENTION

It is a first object of the present invention precisely to enable this time $t_1$ to be reduced very appreciably, and this without increasing prohibitively the number of heads, the object aimed at being an average access time to the tracks which is less than 10 ms.

For this purpose, according to an essential feature of the invention, a hybrid arrangement is provided, that is to say with several heads, which are offset radially but each having a limited radial movement corresponding to the width of a single magnetic zone.

The magnetic surfaces of the disc being divided into several concentric magnetic zones, each zone could thus be explored by a single magnetic head, but several heads could be carried by a same pad, whence, in addition, an economy of material.

Thus the access time to a track will be considerably reduced, since the latter will always be less than or equal to the time taken by a pad to traverse the radial distance corresponding to one magnetic zone width.

In other words, an arrangement according to the present invention, of the general type indicated in the introduction, will be essentially characterized in that each pad is arranged to be able to be moved radially between two extreme positions spaced by a particular radial distance corresponding to the width of each zone, and carries a certain number of magnetic heads, which are assigned each to a different magnetic zone and are positioned in radial spacings such that for one of said extreme positions of the pad each head is situated at the level of one of the peripheral limits of the magnetic zone to which it is assigned, and that, for the other of said extreme positions of the pad, the same head is situated at the level of the other of the peripheral limits of said zone.

It will be possible to provide, for example, two magnetic heads per pad, in which case each pad will be able to be concerned with two successive concentric magnetic zones of the same surface of the disc. The number of pads will then be equal to one half of the number of magnetic zones, with an access time $t_1$ always less than or equal to the time taken by the pads to traverse radially one magnetic zone width.

It will be understood that for a disc of predetermined diameter, an increase in the number of magnetic zones per surface will permit the width of each of them to be diminished, and hence the access time $t_1$ to be reduced.

All this will be better seen from the following, on reading the description of an embodiment of the invention, which will be given below.

Another aspect of the present invention relates to the control mechanism of the movement of the pads bearing the magnetic heads, that is to say of the positioner bearing the group of pads, as well as a drive spool, movable in a permanent magnetic field, the sending of current into this spool servo-coupling the positioner with respect to the tracks of the disc.

On this subject, two techniques are at present known: those with linear movement position seekers, and those with rotary movement position seekers.

Linear movement position seekers ensure low access times over large movements, which movements can be perfectly radial, but their drawback is that they cannot be correctly conpensated with respect to shocks and vibrations.

On the other hand, rotary movement position seekers have the advantage of being less bulky and of being compensatable with respect to vibrations and shocks, their parts can be balanced in rotation, but their maximum movement is not so great, even if they still have quite acceptable access times.

The principal drawback of this type of rotary movement position seeker is moreover that they cannot ensure the movement of a group of pads situated on the same surface of the disc, without loss of magnetic surface of the disc.

In fact, when the pads turn in a group around the rotary axle of the position seeker, each of them follows a path which depends on its distance with respect to the axle, and which will hence be different for each of them.

Thus, if one of the heads traverses exactly the width of the magnetic zone to which it is assigned, another head, either traverses an insufficient width of the corresponding zone, or overshoots this zone, which in both cases will correspond to a loss of the amount of data that the group of heads can record or read.

Another object of the invention is hence to overcome these other drawbacks of the prior art, and here again to arrive at a compromise between the various existing techniques, namely: to obtain a practically rectilinear movement of the pads (and hence of the heads), as with a linear position seeker, this to use at best the magnetic surfaces of the disc, whilst preserving the rotary type position seeker, for better behavior to shocks and vibrations.

Accordingly, there is provided, according to the invention, the group of pads being borne by one and the same support, which can be moved by an electrodynamic motor or the like, that between the movable member of this motor and said support is arranged an articulated parallelogram system whose axles are parallel to the axis of rotation of the disc, two of them being fixed, whilst the other two axles carry said support, the line which joins them being, with respect to the disc, radial or practically radial.

Thus, there is obtained, as desired, on the actuation of said electrodynamic motor, a practically radial movement of the magnetic heads, with satisfactory compensation with respect to shocks and vibrations.

Other more particular characteristics of this arrangement will also be seen better on reading the account of an embodiment of the invention, in no way to be considered as limiting, which will now be described with reference to the figures of the accompanying drawing.

DESCRIPTION OF A PREFERRED EMBODIMENT

Figure 1:
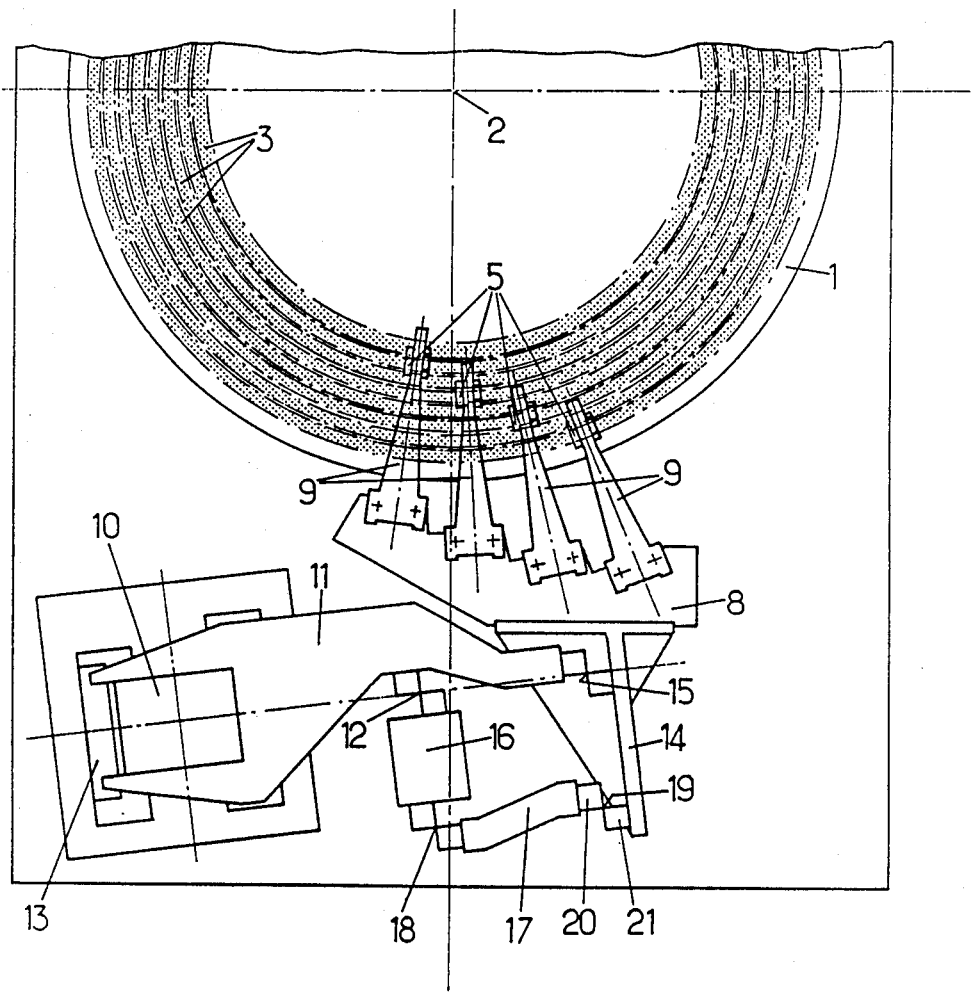
FIG. 1 is a diagrammatic plan view of an arrangement of magnetic heads according to the present invention.

In FIG. 1, the reference numeral 1 indicates a magnetic disc, with axis of rotation 2, and which actually could be constituted by a stack of such discs, each having two magnetic surfaces.

Each of these surfaces comprises a certain number of concentric magnetic zones 3, which, in the example shown, are eight in number and are themselves constituted by a certain number of circular magnetic tracks, for example, 60 in number per zone. These tracks may be read (or recorded) by a group of magnetic heads 4, each head being assigned a particular magnetic zone 3. These heads are borne by pads 5, which can come into a stable cruising configuration at a very short distance from the surface of the disc when the latter rotates at high speed (of the order of 3,600 rpm) the pad being specially shaped for this purpose, and this in manner known in itself.

Figure 2:
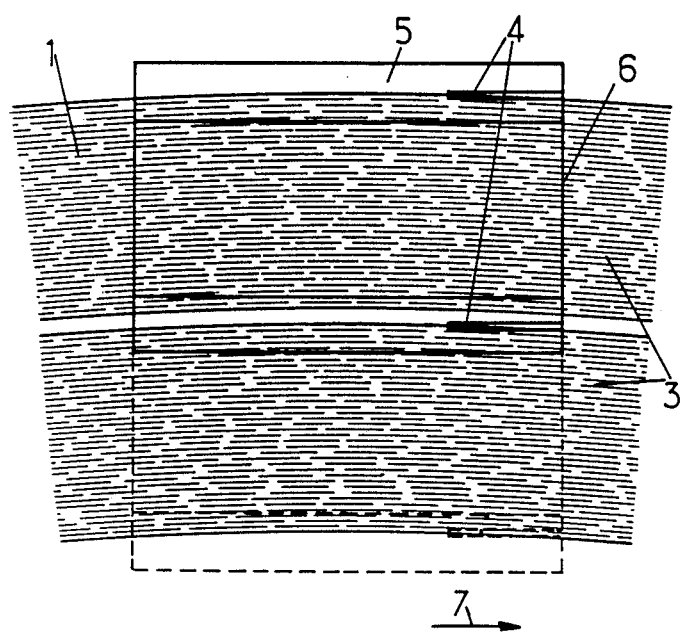
FIG. 2 is a partial plan view in more detail showing more clearly the relative positioning of the two extreme positions of the heads of a pad with respect to the magnetic zones of the disc.
Figure 3:
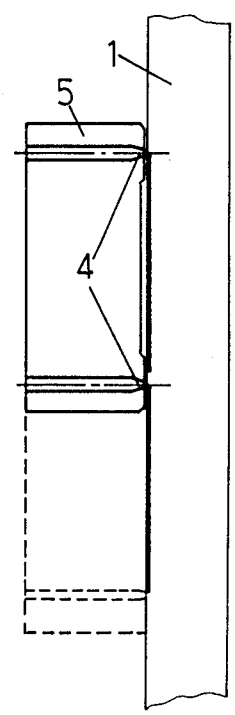
FIG. 3 is a view in profile of the two extreme positions of the pad of FIG. 2.
Figure 4:
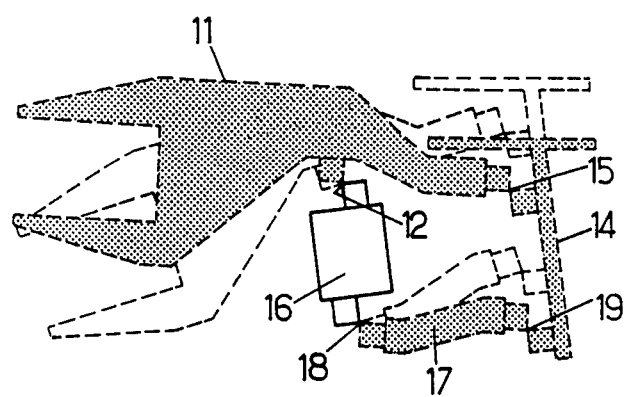
FIG. 4 is a partial plan view of the positioner, showing its two extreme positions.

As better seen in FIG. 2, the magnetic heads 4 are positioned close to the "trailing edge"—6 of the pads 5, the disc turning in the direction of the arrow 7.

From FIG. 2 will be clearly understood, one of the essential arrangements of the present invention: the pad 5 shown (like each of the three other pads 5, which are not visible in this figure) bears two magnetic heads 4 spaced radially so that when one of them is situated close to the outer peripheral edge of the one of the zones 3, the other is situated close to the outer peripheral edge of the neighboring zone 3. In other words, each pad 5, bearing two magnetic heads 4, is concerned with two neighboring magnetic zones 3 of the disc 1; as indicated above, each head 4 is assigned to a single zone 3. At any moment a head cannot explore a track to which it has not been assigned, which results in optimization of the exploitation of the magnetic surfaces of the disc.

From this, it is seen that due to this arrangement it suffices to move a pad 5 radially to have rapid access, through one or other of the heads 4, to the whole of the data borne by the two neighboring magnetic zones 3.

To do this, the pad 5 will only be moved radially over a maximal distance corresponding to the width of the single zone 3. It is seen how very simply the invention enables the access time $t_1$ to be shortened for the tracks concerned of the zones 3.

Another aspect of the present invention relates, as indicated above, to the positioner, namely the assembly of electrical and mechanical means which will permit a particular head to be brought to the track that it must read, and this, for example, by a movement of all of the pads 5, which, for the purpose of simplification, can be carried by the same support.

This support has been referenced at 8 in FIG. 1.

The four pads 5, are connected to this support 8 by pad-holder springs 9.

The electrodynamic motor has been referenced at 10. By a principal arm 11 articulated to a fixed part 16 around an axle 12 parallel to the axle 2, the movable member of this motor, namely the coil 10 (situated in the magnetic field of a permanent magnet 13), is connected to a head-holder arm 14 to which is fixed the aforesaid support 8. The connection between the principal arm 11 and the head-holder arm 14 is effected through an axle 15 parallel with the axle 12. A secondary arm 17 connects besides the fixed part 16 to the arm 14 through two other axles 18 and 19 parallel with the axles 12 and 15 and forming with the latter an articulated parallelogram 11-16-17-14.

Thus, it is understood that due to this arrangement it will possible to obtain a practically radial movement of the arm 14 and hence of the pads 5 on pivoting of the principal arm 11 around the axle 12, when the motor 10 is energized, and this with excellent possibilities of compensation of the system with respect to vibrations and shocks.

Considering the very small angular movements of the principal arm 11, of the order of 2.5°, it will not be possible to use ball bearings or the like at the level of the axles 12-15-18-19 of the deformable parallelogram, since these bearings would not be sufficiently lubricated and would risk rapid deterioration.

Figure 5:
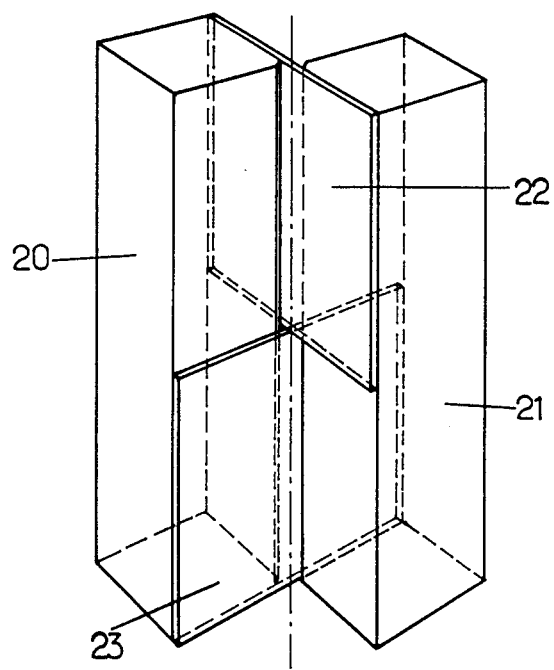
FIG. 5 is a perspective view showing a possible construction of the axles of the articulated parallelogram.

This is why there will preferably be used flexible blade articulations such as that which is shown by way of example in FIG. 5.

Given two rigid support parts 20 and 21 fixed to the members to be connected, (see also FIG. 1), they are joined by two flexible blades 22 and 23 situated at rest in two planes at right angles of the which the intersection is the axis of rotation of one rigid support 20 or 21 with respect to the other, when the blades bend. In this way excellent articulation, is obtained which in addition has an automatic elastic return into its neutral position, and which offers a minimum of friction and no risk of jamming. In addition, this type of articulation has great rigidity with respect to forces other than the rotary torque, and no play.

As is self-evident and emerges besides already from the foregoing, the invention is in no way limited to those of its types of application and embodiments which have been more particularly envisaged; it encompasses, on the contrary, all modifications.

I claim:

1. Arrangement of magnetic recording and/or readout heads for disc memories, said discs comprising on their surfaces a certain number of concentric magnetic zones each constituted by a predetermined number of circular tracks, said heads being for their part mounted on pads borne by one and the same support, so as to be movable radially with respect to a disc, at a very short distance from the surface of the disc, which support can be driven by an electrodynamic motor or the like, wherein between the movable member of said motor and said support is arranged an articulated parallelogram system whose axles are parallel with the axle of rotation of the disc, two of them being fixed, whilst the other two axles bear said support, the line which joins them being, with respect to the disc, radial or practically radial, wherein each pad is arranged to be movable radially between two extreme positions spaced by a predetermined radial distance corresponding to the width of each zone and carries a certain number of magnetic heads, which are assigned each to a different magnetic zone and are positioned in radial spacings such that for one of said extreme positions of the pad each head is situated at a level of one of the peripheral limits of the magnetic zone to which it is assigned, and so that, for the other said extreme position of the pad, the same head is situated at a level of the other of the peripheral limits of said zone.

2. Arrangement according to claim 1, wherein said axles are of the crossed flexible blade type.

3. Arrangement according to claim 1, wherein each pad bears two magnetic heads which are assigned to two successive magnetic zones of the face concerned of the disc.

4. Arrangement according to claim 1, wherein said articulated parallelogram comprises a head-holder arm joined by two axles parallel respectively, on the one hand to a principal arm articulated to a fixed part and itself connected to a movable member of the electrodynamic motor, and on the other hand to a secondary arm also articulated to said fixed part, said articulation axles of the head-holder arm and of the articulation of said fixed part being parallel to the axis of rotation of the discs and constituting an articulated parallelogram, the two first axles mentioned being aligned radially or practically radially with respect to the discs.

5. Arrangement according to claim 4, wherein said axles are of the crossed flexible blade type.

6. Arrangement of magnetic recording and/or readout heads for disc memories, said discs comprising on their surfaces a certain number of concentric magnetic zones each constituted by a predetermined number of circular tracks, said heads being for their part mounted on pads borne by one and the same support, so as to be moveable radially with respect to a disc, at a very short distance from the surface of the disc, which support can be driven by an electrodynamic motor or the like having a movable member, wherein between the movable member of said motor and said support is arranged an articulated parallelogram system comprising a head-holder arm joined by two axles parallel respectively, on the one hand to a principal arm articulated to a fixed part and itself connected to the movable member of the electrodynamic motor, and on the other hand to a secondary arm also articulated to said fixed part, said articulation axles of the head-holder arm and of the articulation of said fixed part being parallel to the axis of rotation of the discs and constituting an articulated parallelogram, the two first axles mentioned being aligned radially or practically radially with respect to the discs.

7. Arrangement according to claim 6, wherein each pad bears two magnetic heads which are assigned to two successive magnetic zones of the face concerned of the disc.

8. Arrangement according to claim 6, wherein said axles are of the crossed flexible blade type.

* * * * *